US011354708B2

(12) United States Patent
Chanda et al.

(10) Patent No.: US 11,354,708 B2
(45) Date of Patent: *Jun. 7, 2022

(54) METHOD AND SYSTEM FOR UPDATING THE PRESENTATION OF DIGITAL BRAND ASSETS

(71) Applicant: SYNQY CORPORATION, Pleasant Hill, CA (US)

(72) Inventors: Nikolaus Chanda, Concord, CA (US); Michael Weissman, Danville, CA (US); David Mosby, San Ramon, CA (US); John Hoye, Walnut Creek, CA (US)

(73) Assignee: SYNQY Corporation, Pleasant Hill, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/862,081

(22) Filed: Apr. 29, 2020

(65) Prior Publication Data

US 2020/0258131 A1 Aug. 13, 2020

Related U.S. Application Data

(63) Continuation of application No. 14/092,733, filed on Nov. 27, 2013, now Pat. No. 10,679,259.

(Continued)

(51) Int. Cl.
*G06Q 30/02* (2012.01)
*H04L 9/40* (2022.01)

(52) U.S. Cl.
CPC ..... *G06Q 30/0276* (2013.01); *G06Q 30/0241* (2013.01); *G06Q 30/0244* (2013.01);

(Continued)

(58) Field of Classification Search
None
See application file for complete search history.

(56) References Cited

U.S. PATENT DOCUMENTS 7,747,465 B2 * 6/2010 Srinivasan ............. G06Q 30/02
705/14.1
8,566,154 B2 10/2013 Merriman et al.
(Continued)

OTHER PUBLICATIONS

An Analysis of URLs Generated from JavaScript Code, Zhou et al., 2012 IEEE/ACIS 11th International Conference on Computer and Information Science.*

(Continued)

*Primary Examiner* — David J Stoltenberg
(74) *Attorney, Agent, or Firm* — Perkins Coie LLP; Colin Fowler; Michael Glenn

(57) ABSTRACT

A digital brand asset system performs the steps of providing payloads for a smart brand asset to a plurality of web servers which include codes representing the smart brand asset, receiving feedbacks on how the smart brand asset is presented on the website servers, collecting web journey data of the website visitors' who have interacted with the smart brand asset, generating a report detailing how effective the smart brand asset has been on the website servers, and presenting the report on a dashboard. Generally, by monitoring the website servers and visitors interacting with the smart brand assets, a report can be generated for the brand owners to determine the effectiveness of the smart brand assets hosted on the website servers. The raw data used to generate the report can be used to autonomically and dynamically change the content based upon the interpretation of the feedbacks.

20 Claims, 10 Drawing Sheets

Related U.S. Application Data

(60) Provisional application No. 61/730,421, filed on Nov. 27, 2012.

(52) U.S. Cl.
CPC ..... *G06Q 30/0254* (2013.01); *G06Q 30/0255* (2013.01); *G06Q 30/0277* (2013.01); *H04L 63/08* (2013.01); *H04L 63/12* (2013.01)

(56) References Cited

U.S. PATENT DOCUMENTS

| | | | |
|---|---|---|---|
| 8,631,473 B2 | 1/2014 | Bhatia et al. | |
| 8,694,610 B2 | 4/2014 | Jungck | |
| 8,700,630 B2 | 4/2014 | Wexler et al. | |
| 8,799,200 B2 | 8/2014 | Lahav | |
| 8,856,869 B1 | 10/2014 | Brinskelle | |
| 9,292,361 B1* | 3/2016 | Chitilian | G06Q 30/0277 |
| 9,305,098 B1 | 4/2016 | Willingham et al. | |
| 10,636,052 B2 | 4/2020 | Moran et al. | |
| 2002/0046096 A1* | 4/2002 | Srinivasan | G06Q 30/0211 |
| | | | 705/14.66 |
| 2002/0147637 A1 | 10/2002 | Kraft et al. | |
| 2003/0046165 A1 | 3/2003 | Topel et al. | |
| 2004/0093327 A1 | 5/2004 | Anderson et al. | |
| 2004/0260767 A1 | 12/2004 | Kedem et al. | |
| 2005/0050097 A1 | 3/2005 | Yeh et al. | |
| 2005/0091111 A1* | 4/2005 | Green | G06Q 30/0262 |
| | | | 705/14.59 |
| 2007/0050252 A1 | 3/2007 | Jain et al. | |
| 2007/0239542 A1* | 10/2007 | Shapiro | G06Q 30/0277 |
| | | | 705/14.54 |
| 2007/0250468 A1 | 10/2007 | Pieper | |
| 2008/0004960 A1 | 1/2008 | Coomer et al. | |
| 2008/0151315 A1* | 6/2008 | Flake | G06Q 30/0276 |
| | | | 358/401 |
| 2008/0313031 A1 | 12/2008 | Li et al. | |
| 2009/0006214 A1* | 1/2009 | Lerman | G06Q 30/0277 |
| | | | 705/14.73 |
| 2009/0012863 A1* | 1/2009 | Saephan | G06Q 30/0269 |
| | | | 705/14.54 |
| 2009/0037355 A1 | 2/2009 | Brave et al. | |
| 2009/0070687 A1 | 3/2009 | Mazzaferri | |
| 2010/0100925 A1 | 4/2010 | Hinton | |
| 2010/0180296 A1* | 7/2010 | Hendricks | H04N 21/2543 |
| | | | 725/34 |
| 2010/0332993 A1* | 12/2010 | Bousseton | G06Q 30/02 |
| | | | 715/738 |
| 2011/0071997 A1 | 3/2011 | Sullivan et al. | |
| 2011/0082755 A1* | 4/2011 | Itzhak | G06Q 30/0273 |
| | | | 705/14.69 |
| 2011/0125587 A1 | 5/2011 | Netzer et al. | |
| 2011/0161407 A1* | 6/2011 | Juda | G06Q 30/0243 |
| | | | 709/203 |
| 2011/0161847 A1 | 6/2011 | Chaikin et al. | |
| 2011/0208585 A1* | 8/2011 | Daboll | G06Q 30/0255 |
| | | | 705/14.53 |
| 2011/0282860 A1 | 11/2011 | Baarman et al. | |
| 2011/0283359 A1 | 11/2011 | Prince et al. | |
| 2012/0011432 A1 | 1/2012 | Strutton | |
| 2012/0016749 A1* | 1/2012 | Lisbakken | G06Q 30/0276 |
| | | | 705/14.71 |
| 2012/0022951 A1* | 1/2012 | Tolompoiko | G06Q 30/0272 |
| | | | 705/14.68 |
| 2012/0095837 A1* | 4/2012 | Bharat | G06F 16/9535 |
| | | | 705/14.54 |
| 2012/0254149 A1 | 10/2012 | Ramsay | |
| 2012/0259882 A1 | 10/2012 | Thakur et al. | |
| 2012/0284252 A1 | 11/2012 | Drai et al. | |
| 2012/0290399 A1* | 11/2012 | England | G06Q 50/01 |
| | | | 705/14.66 |
| 2013/0110637 A1* | 5/2013 | Bott | G06Q 30/0244 |
| | | | 705/14.64 |
| 2013/0166580 A1 | 6/2013 | Maharajh et al. | |
| 2013/0287305 A1 | 10/2013 | Dhanda et al. | |
| 2014/0075283 A1 | 3/2014 | Coursol et al. | |
| 2014/0122255 A1 | 5/2014 | Snyder | |
| 2014/0229271 A1* | 8/2014 | Clapp | G06Q 30/0245 |
| | | | 705/14.44 |
| 2015/0213481 A1* | 7/2015 | Yuan | G06Q 30/0244 |
| | | | 705/14.43 |
| 2015/0254732 A1* | 9/2015 | Snyder | G06Q 30/0277 |
| | | | 705/14.72 |
| 2017/0116640 A1 | 4/2017 | Sah et al. | |
| 2018/0218389 A1 | 8/2018 | Walker et al. | |

OTHER PUBLICATIONS

Jane Portman, et al., "Brand Website Activity Impact Analysis: Do Page Views Drive Rx Outcomes?", Pharmaceutical Management Science Association (PMSA). Sep. 15, 2011. (Year: 2011).

Neville, Kat, "How To Design Style Guides for Brands and Websites", Smashing Magazine, Jul. 21, 2010. (Year: 2010).

Vetro, Salvatore, "Observer Design Pattern Using JavaScript", Apr. 26, 2006, pp. 1-6.

Dong, Qin, "Search-Engine_Oriented Theme Crawler Design", Yancheng Institute of Technology, Yancheng, Jiangsu Province, China, International Conference on System Science, Engineering Design and Manufacturing Informatization, IEEE Computer Society, 2010, pp. 303-306., pp. 303-306.

Wang, Nan, "Design and Implementation of a Crawling System in Shopping Search Engine", School of Journalism and Communication, Tsinghua University, Beijing, China, Second International Workshop on Computer Science and Engineering, 2009, pp. 212-216., pp. 212-216.

\* cited by examiner

METHOD AND SYSTEM FOR UPDATING THE PRESENTATION OF DIGITAL BRAND ASSETS

CROSS REFERENCE TO RELATED APPLICATIONS

This application is a continuation of U.S. application Ser. No. 14/092,733, titled "Method and System for Dynamic Online Digital Brand Assets" and filed on Nov. 27, 2013, which claims priority to provisional U.S. patent application Ser. No. 61/730,421, filed Nov. 27, 2012, each of which is incorporated herein by reference in its entirety.

BACKGROUND OF THE INVENTION

Field of the Invention

The invention relates to promoting and using brand assets online. More particularly, the invention concerns a framework for brand owners and website owners to control the way of distributing and maintaining brand assets being presented on the Internet.

Description of the Related Art

The Internet is a useful platform for brand owners to promote their brands using various brand assets. The brand assets can include images, videos, presentations, brochures (e.g., PDF or other formats), flash animations, software applications, widgets or other types of media related to the brands. Often, these brand assets are defined by rules as to how they are to be used. These rules are called brand guidelines. When brand owners use their brand assets, they have controls of how the brand assets are used and applied according to the brand guidelines.

In order to extend a brand's reach to a wider audience, a brand owner shares the brand assets with consumers, reseller partners, media, trade associations and other interested third parties for use on websites that are not managed or maintained by the brand owner.

Presently, the method for distributing and maintaining brand assets when they are shared with third parties is manual and disparate. FIG. 1 is a flow diagram showing the legacy process of distributing and managing brand assets. Once a brand asset has been created in step 101, the brand owner distributes the brand asset to its third party user via email (in step 102) or via an extranet (e.g., a website in step 104 and 106). Ultimately, the recipient of the brand asset uploads the asset into a website system and links the asset in code (e.g., HyperText Markup Language, "HTML") to the location of the file on the system in step 112. However, previous to publishing the brand asset, the recipient of the brand asset manipulates the brand asset to fit the website that is going to host the asset in step 110. Often, that manipulation violates the brand guidelines, which can potentially harm the equity of the brand. Such manipulation can include stretching images, placing them in places not approved by the brand owners, etc.

Due to the nature of the Internet, users of brand assets can source these assets by copying them from websites other than the brand owner's, in step 108. As a result, these users may use the brand assets that do not conform to the brand guidelines.

Brand assets often change since they represent products, which often receive updates or new models. As a result, brand assets can become out of date quickly. When a person sources an out-of-date brand asset and puts that asset on another website, the incorrect brand information is propagated throughout the Internet, which again harms the brand's equity. Maintaining the currency and correctness of brand assets on websites that are not managed by brand owners is a challenging task, because these brand owners lack visibility to where those brand assets exist on the Internet and lack the ability to remotely update and/or manage those brand assets.

When a brand owner wishes to promote its business on its own website, often multiple brand assets are presented together. For example, a product photograph may be marketed adjacent to a set of specifications, a brochure, a video or some other form of information about the brand and its products or services. This is often called merchandising. When a brand owner controls the website, it is easy for that owner to merchandise these brand assets in a consistent, attractive manner. However, when a brand owner wishes to promote its business on another company's website that is not owned or controlled by the brand owner, it is very difficult to consistently deliver brand assets that are well merchandised together, especially not within a specific, packaged area.

Brands are also used to apply credibility to the users of the brands. For example, a medical board certification or accreditation logo can increase the perceived value of the doctor who has such a certification. There is an association between the beneficiary of such accreditation (e.g. the doctor) and the website that represents that doctor. Today, the brand asset is simply an image file representing the brand logo for that certification and there is no authentication that the brand user is authorized to use the brand and there is no association between the website using the brand asset, the website owner authorized to use the brand asset and the company making the authorization.

Finally, brand owners have limited visibility regarding where these brand assets are used online, who is using those assets, how many people are viewing or interacting with those assets and under what condition those brand assets appear. This impacts the ability for brand owners to control those brand assets, value the brand assets, and evaluate the return on investment from the use of those brand assets.

SUMMARY OF THE INVENTION

A digital brand asset system allows a brand owner to create, distribute, maintain, manage, merchandise and analyze smart brand assets. The system enables the brand owner to better merchandise brands and products online, ensures brand consistency and currency, enforces compliance with brand guidelines, and delivers brand engagement across third-party controlled websites.

The system enables distribution and sharing of smart brand asset across the websites. The websites can host webpages containing codes representing the smart brand assets. When a user device retrieves a webpage from a website and renders the webpage, it executes the code and requests the content of the smart brand assets from a brand asset server. Through the brand asset server, a brand owner can control the content and the presentation of the smart brand asset hosted by the websites.

A smart brand asset is an interactive container of brand assets such as images, videos, interactive software code, product brochures, embed codes from other websites, and other items. A smart brand asset is represented by a unique embed code which is provided by the System. This embed code is placed on web pages, e.g. in lieu of an image reference, to represent the smart brand asset. When a web page containing a smart brand asset embed code is rendered, a computer script gets called to load the initial payload of the smart brand asset into a web browser. This payload is typically an image but can also be a piece of text, video or other brand asset object. Depending on how the smart brand asset is configured, the smart brand asset may launch a secondary payload of digital brand assets when the consumer interacts with the smart brand asset. These secondary assets can be displayed, for example in a lightbox or within the same page and location as the initial payload. A smart brand asset can include a single brand asset (i.e. the initial payload), or include multiple brand assets in multiple slides.

The brand asset server can control the content and presentation of the smart brand asset hosted on websites based on various factors. For instance, the factors can include, previous click through rates, aggregated shopper behaviors, geographical locations of the websites or website visitors, categorized types of websites, blacklist of websites.

The brand owners can specify brand guidelines that determine how the smart brand assets are presented based on the environment in which the smart brand assets are placed. Smart brand assets can further contain unique identifications so that a search engine crawler can index the web pages containing the content of the smart brand assets. By monitoring the website servers and visitors interacting with the smart brand assets, a report can be generated for the brand owners to determine the effectiveness of the smart brand assets hosted on the website servers.

DETAILED DESCRIPTION

Figure 1:
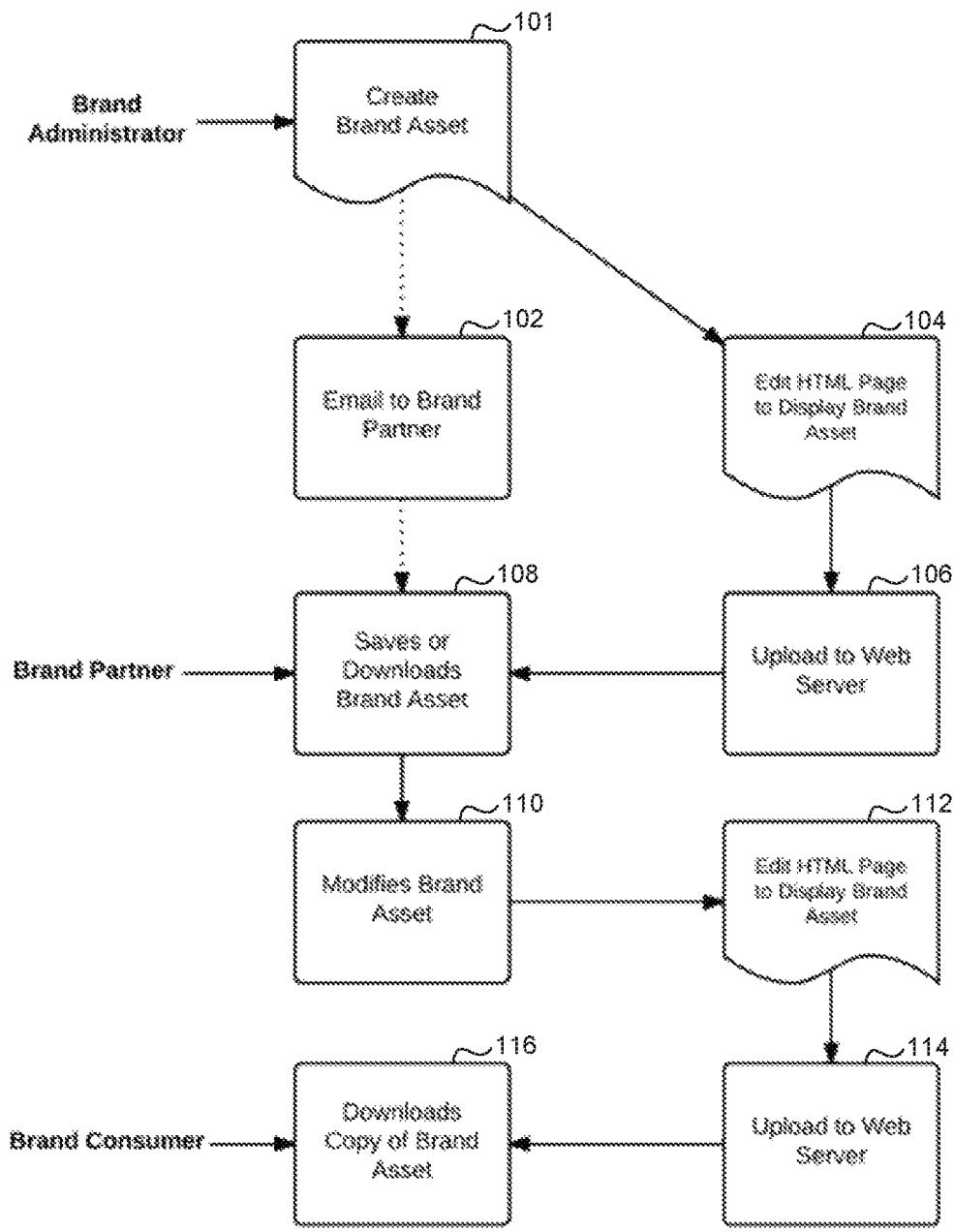
FIG. 1 is a flow diagram showing a legacy process of distributing and managing brand assets.

The nature, objectives, and advantages of the invention will become more apparent to those skilled in the art after considering the following detailed description in connection with the accompanying drawings.

Definitions

Terms used in the claims and specification are to be construed in accordance with their usual meaning as understood by one skilled in the art except and as defined as set forth below.

Brand Asset: A digital representation of a brand or a product identified by the brand. For example, a brand asset can include product hero shot, product brochure, textual content, image logo, video, training materials, etc.

smart brand asset: An interactive container of brand assets. A smart brand asset ("SBA") is represented by an embed code including references to images, videos, interactive software code, product brochures, embed codes from other websites, and other items that can be placed on a website and accessed by a browser when deployed on a website. The smart brand asset is capable of delivering a controlled presentation of the brand assets determined by the brand owner.

Slide: A collection of digital content merchandised together. A slide typically includes one or more brand assets and/or other objects such as buttons or menus for web browsing navigation.

Payload: A collection of slides or a single slide.

Initial Payload: The slide that would be displayed when the smart brand asset first loads on a web page.

Secondary Payload: The Slide or Slides that would be displayed, e.g. in a lightbox, when a user interacts with the smart brand asset, e.g. by moving the mouse icon over or clicking on the smart brand asset.

Lightbox: An overlay showing objects that is displayed on top of a current web page. When the overlay is displayed, the rest of the web page content may be darkened.

System: A computer system as a whole that is used to create, configure, administer, and deliver payloads of smart brand assets.

Brand Owner: An individual or entity, or a representative of the individual or entity, who creates and publishes the smart brand assets and may be the owner of a given brand asset. The brand owner can be also responsible for creating other users of the system.

Brand Partner: An individual or entity who is a representative of a company that is a business partner to the brand owner. For example, a brand partner can be a distributor or a reseller. A brand partner can set filters on what will show up on their website or, on occasion what an anonymous administrator's web site will display (e.g. setting filters of which products a particular reseller can display on their site) and configure applications as well as site configurations.

Anonymous Administrator: An individual or entity who is an owner and/or administrator of a website that contains a smart brand asset but does not have the brand partner authorization (as assigned by the brand owner) to configure a given smart brand asset. Examples of anonymous administrators can be blog owners, publishers that publish articles containing a smart brand asset, resellers or dealers of a product that are known by the brand partner (e.g. a distributor) but do not necessarily have a business relationship with the brand owner. An anonymous administrator can configure certain aspects of the smart brand asset for their website only.

Site Owner: An individual or entity who has administrative responsibilities for updating websites that contain a smart brand asset. A site owner can be, e.g. a brand partner or anonymous administrator.

Consumer: A viewer of a smart brand asset presented on a web page. A consumer has no administration capability but may share the smart brand asset with other consumers if the smart brand asset is configured to be shareable.

Environment of Smart Brand Asset System

Figure 2:
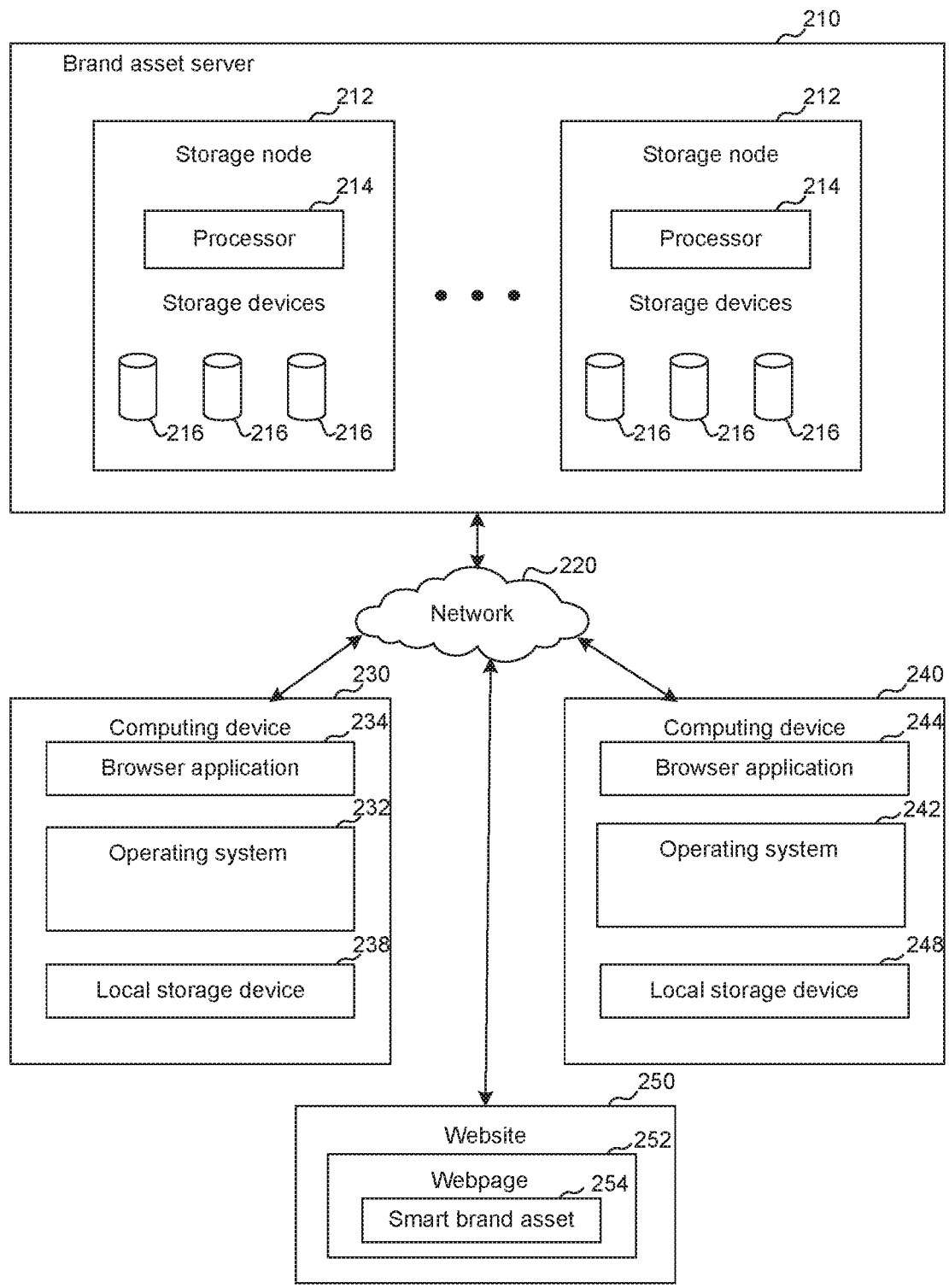
FIG. 2 is a block diagram of the components and interconnections of a smart brand asset system, according to an embodiment of the invention.

FIG. 2 is a block diagram of the components and interconnections of a smart brand asset system, according to an embodiment of the invention. The brand asset server 210 is responsible for creating, configuring, administering, and delivering payloads of smart brand assets. The brand asset server 210 is configured to communicate with the computing devices. In one embodiment, the brand asset server 210 can be a server cluster having computer nodes interconnected with each other by a network. The cloud server 210 can contain storage nodes 212. Each of the storage nodes 212 contains one or more processors 214 and storage devices 216. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 230 and 240 can each communicate with the brand asset server 210 and a website 250 via network 220. The network 120 can be, e.g., the Internet. The website 250 can be owned by the brand owner or other entities that are not controlled by the brand owner. The website 250 hosts a webpage 252 which contain a code representing a smart brand asset 254. Although FIG. 2 illustrates two computing devices 230 and 240, a person having ordinary skill in the art will readily understand that the technology disclosed herein can be applied to a single computing device or more than two computing devices connected to the brand asset server 210 and website 250.

The computing device 230 includes an operating system 232 to manage the hardware resources of the computing device 230 and provides services for running browser application 234. The browser application 234 stored in the computing device 230 require the operating system 232 to properly run on the device 230. The computing device 230 includes at least one local storage device 238 to store the computer applications and user data. The computing device 230 or 240 can be a desktop computer, a laptop computer, a tablet computer, an automobile computer, a game console, a smart phone, a personal digital assistant, smart TV, set top box, DVR, Blu-Ray, residential gateway, over-the-top Internet video streamer, or other computing devices capable of running computer applications, as contemplated by a person having ordinary skill in the art.

The browser application 234 downloads the webpage 252 from the website 250. To render the webpage 252, the browser application 234 executes the code contained in the webpage 252, including the code representing the smart brand asset 254. Following the instructions of the code, the computing device 230 requests the content of the smart brand asset 254 from the brand asset server 210. The brand asset server can dynamically determine the content and the presentation of the smart brand asset 254, and deliver them to the computing device 230.

Figure 3:
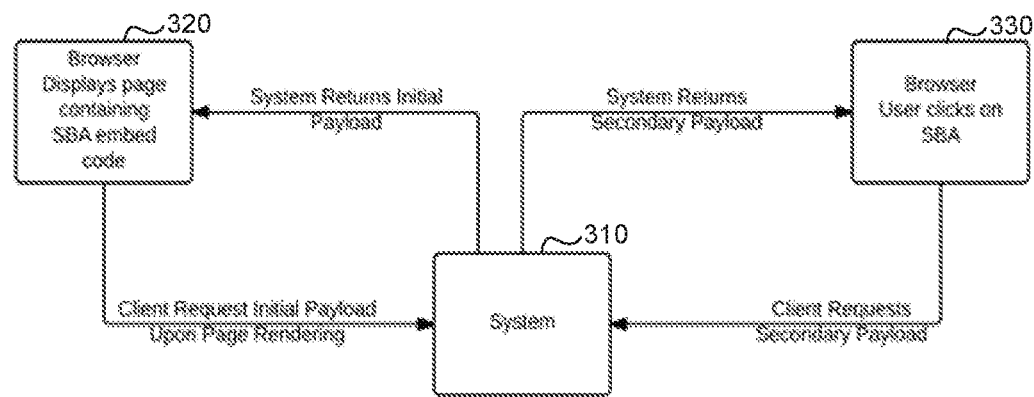
FIG. 3 is a block diagram of showing the interaction among the smart brand asset system and browser applications for displaying the smart brand asset, according to an embodiment of the invention.

FIG. 3 is a block diagram of showing the interaction among the smart brand asset system and browser applications for displaying the smart brand asset, according to an embodiment of the invention. A browser application 320 running a computing device loads and displays a webpage containing an SBA embed code. Upon rendering the webpage, the browser application 320 requests an initial payload of the smart brand asset from the system 310. In response, the system 310 returns an initial payload of the smart brand asset to the browser application 320.

The system 310 can further send secondary payloads of smart brand assets to computing devices running browser applications. For example, a browser application 330 showing the initial payload of the smart brand asset can receive a signal from its computing device indicating that the user of the device clicks on the smart brand asset. Accordingly, the browser application 330 request second payload of the smart brand asset from the system 310. In response, the system 310 can return the secondary payload to the browser application 330.

Figure 4:
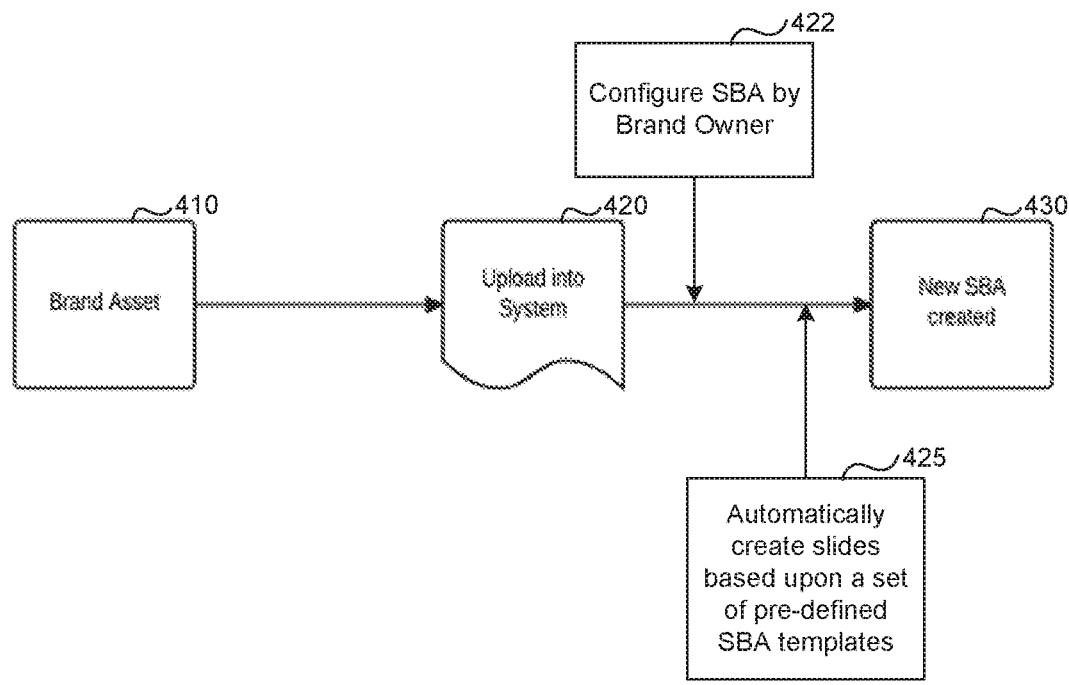
FIG. 4 is an example flow diagram showing creation of a smart brand asset, according to an embodiment of the invention.

FIG. 4 is an example flow diagram showing creation of a smart brand asset, according to an embodiment of the invention. A brand owner can create a smart brand asset by dragging and dropping one or more brand asset into a pre-defined area of a webpage and loading the brand asset into the system. The brand owner can further define the contents and order of the slides in the smart brand asset.

For example, in step 410, the brand owner can drag a file containing a brand asset from their computer desktop or a browser onto a smart brand asset creation pallet, which is a defined area of a webpage. In step 420, the system then uploads the file into the system. In step 430, the system establishes an identification code number for the asset, creates a smart brand asset, and displays it in a smart brand asset editor. The smart brand asset is now ready for review. The brand owner may then choose to publish the smart brand asset by clicking a "Publish" button and the System will create a unique embed code for that smart brand asset and registers the smart brand asset as a published smart brand asset within the system.

In addition, the brand owner can further create the content of the smart brand asset by using the templates provided by the System. Through the proprietary templates, the brand owner can create multiple payload variants for a smart brand asset. As FIG. 4 shows, the brand owner can simply load the selected brand assets into the System in step 420. Optionally the brand owner can further configure the smart brand asset to optimize the payload in step 422. The System in step 425 can automatically create multiple variants of slides based upon a set of pre-defined templates from each group of brand assets and organize the slides into a queue, in order to achieve the best return rate of investment.

Instead of pre-defining the potential choices of variants and manually crafting these variants in HTML by the brand owner or its representative, the System dynamically creates the payload variants automatically. This saves design and prioritization time and delivers a set of variants that are a factorial of the number of assets combinations.

During the process illustrated in FIG. 4, no coding or graphic design skills are required to create a sharable smart brand asset. The process eliminates all unnecessary steps needed for smart brand asset creation from any brand asset. It also applies drag and drop capabilities typically limited to computer-hosted applications to a web-hosted application.

Figure 5:
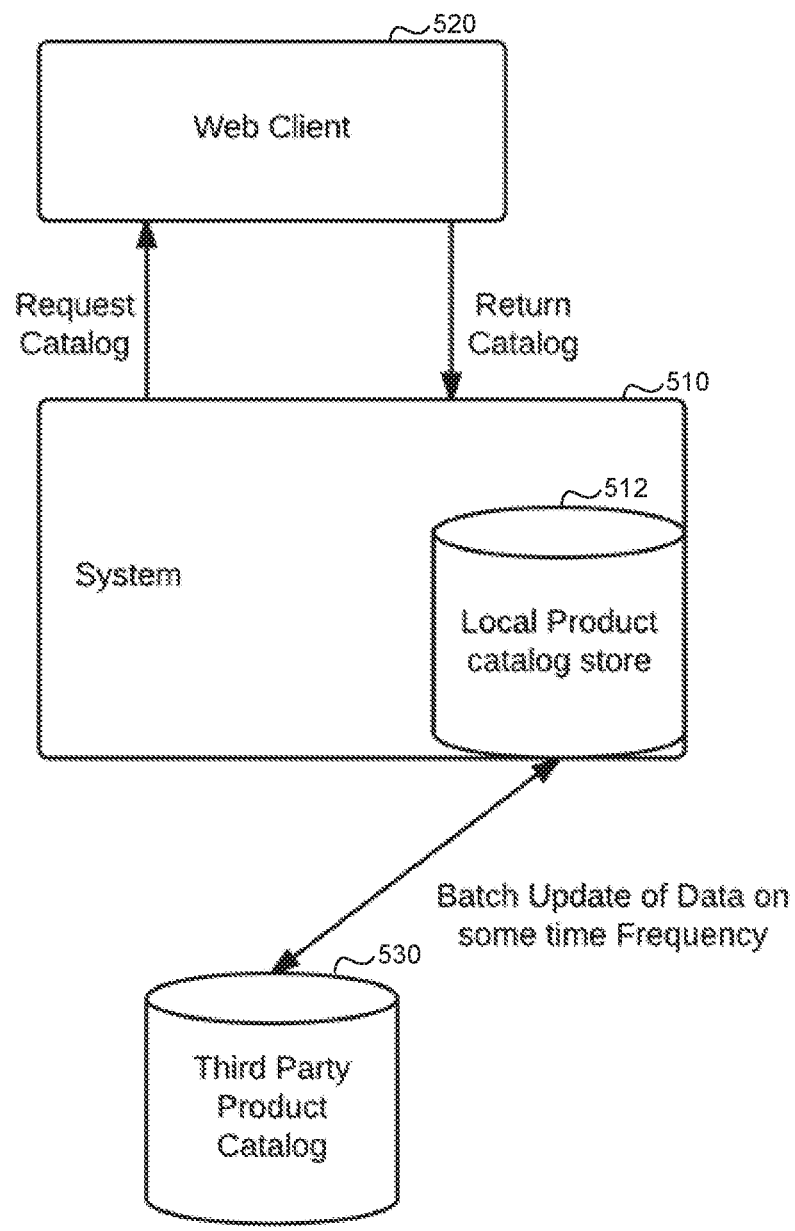
FIG. 5 is a block diagram of showing a smart brand asset system that is database driven, according to an embodiment of the invention.

FIG. 5 is a block diagram of showing a smart brand asset system that is database driven, according to an embodiment of the invention. A brand owner may want to show his entire product offering (or a subset of the offering) where the brand appears, so that the brand always carries an up to date catalog of products to potential buyers. This is particularly relevant when a reseller doesn't want to designate a whole web page to a vendor's product selection and wants the product catalogue to appear from within a single object such as a logo or product photograph.

For example, a single smart brand asset may be created for a given product catalog containing an initial payload and a second payload. The content of the secondary payload is store in a product catalog database 512 of the system 510. When a user clicks on the smart brand asset, the product catalog will be displayed in a lightbox. The database 512 (also referred to as product catalog store) includes rich-media data elements of the secondary payload for the smart brand asset. When a web client 520 tries to load the secondary payload of the smart brand asset, it requests the data elements (also referred to as catalog) from the system 510. The system 510 reads the data elements from the database 512 and returns them to the web client 520. The web client can present the data elements in a layout pre-defined by the embed code of the smart brand asset. The data elements may be clickable, leading to more specific information about a given clicked area.

There may be a third party product catalog database 530 to supply third party data elements. For example, a smart brand asset may include some data elements created by a third party. The local catalog database 512 can synchronize with the third party product catalog database 530 to update the third party data elements in batches.

Recommendation Engine of Smart Brand Asset Based on Historical Data

Figure 6:
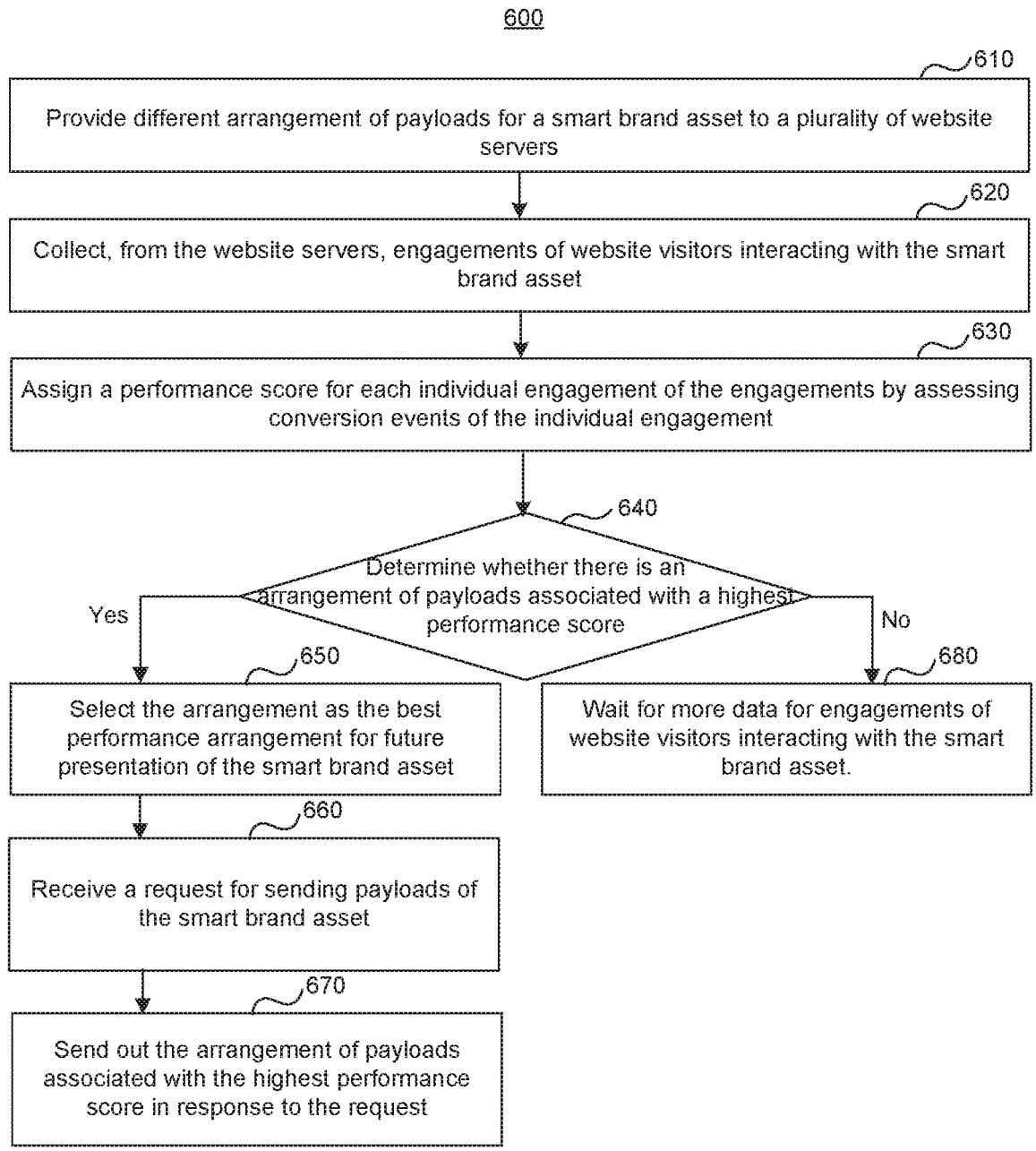
FIG. 6 is an example flow diagram showing a mechanism of a recommendation engine to adjust content appearing within a smart brand asset based on previous user behavior characteristics, according to an embodiment of the invention.

A smart brand asset system can control in real time the content and the presentation of a smart brand asset hosted by a website based on various factors. For example, the smart brand asset system can reorder the content appearing within a smart brand asset based upon previous user behavior characteristics. FIG. 6 is an example flow diagram showing a mechanism of a recommendation engine to adjust content appearing within a smart brand asset based on previous user behavior characteristics, according to an embodiment of the invention. The content adjusting can include, for example, reordering content (e.g., reordering slides or payloads of the smart brand asset), changing content of the smart brand asset, changing page layout of the smart brand asset, or changing product offers.

A brand owner wants his resellers to merchandise his products in a quick and efficient way. To improve overall sales and profitability, the websites of the resellers need to present the smart brand assets with a high conversion rate. The recommendation engine is to help the brand owners who are delivering product feeds to optimize their product catalog presentation to ensure website visitors are presented in the most profitable layout possible. Typically the user behavior across the websites in an dealer network are consistent and can be collected across the entire network of resellers to model shopping/behavior patterns having statistical significances. The recommendation engine determines the feeds for the smart brand asset based on the user behavior patterns.

The recommendation engine collects the data of website visitors interacting with the smart brand asset across the websites hosting the smart brand asset. When a website visitor visits a webpage containing a smart brand asset, the code representing the smart brand asset captures the visitors' interaction with the smart brand asset and sends the data to a brand asset server running the recommendation engine. The recommendation engine aggregates all the information across the websites and determines the arrangement of payloads of the smart brand asset having the best performance across the dealer network. Based upon this data, the System can make recommended changes to content or layout based upon the aggregated behavior of all shoppers.

In step 610, a recommendation engine provides different arrangement of payloads for a smart brand asset to a plurality of website servers. The website server hosts webpages including codes representing the smart brand asset and presenting the different arrangements of payloads. The recommendation engine can be implemented, for example, as a module running at a brand asset server owned by the brand owner.

In step 620, the recommendation engine collects, from the website servers, engagements of website visitors interacting with the smart brand asset. In step 630, the recommendation engine assigns a performance score for each individual engagement of the engagements by assessing conversion events of the individual engagement. An engagement may involve multiple different conversion events. For example, an engagement may include conversion events such as click through rates, mouse hover times, play lengths, number of tabs used, clicking a social engagement button, usage of online chat, commenting or reviewing an offering, or filling out a form within the smart brand asset.

In step 640, the recommendation engine determines whether there is an arrangement of payloads associated with a highest performance score. The arrangement with a highest performance score may be an existing arrangement tested by the previous user interactions, or an arrangement predicted by the analysis. In other words, the arrangement with a highest performance score may be selected among the existing arrangements based on the performance scores, or may be predicted as a new arrangement. If there is no arrangement of payloads determined with a highest performance score, in step 680, the recommendation engine may choose to wait for more data for engagements of website visitors interacting with the smart brand asset.

If there is an arrangement of payloads determined with a highest performance score, in step 650, the recommendation engine selects the arrangement as the best performance arrangement for future presentation of the smart brand asset. In step 660, the recommendation engine receives a request for sending payloads of the smart brand asset. In step 670, the recommendation engine sends out the arrangement of payloads associated with the highest performance score in response to the request.

Automatic Multivariate Payload Creation

The smart brand asset system can automatically create multiple payload variants for a smart brand asset. For example, a brand owner may prefer automatically constructing a smart brand asset with different payloads by letting the system decide which variants to show in order to achieve the best return rate of investment for the smart brand asset.

In an interface provided by the smart brand asset system, the brand owner can load multiple brand assets into the system to create a smart brand asset and configure the smart brand asset to optimize the payload of the smart brand asset. The system can automatically create multiple variants of slides based upon a set of pre-defined templates from each group of brand assets. The system then put the variants into a queue for performance optimization upon rendering.

Instead of pre-defining the potential choices of variants and manually crafting the variants presented in web pages, the smart brand asset system dynamically creates the payload variants automatically. The process can save design and prioritization time and deliver a set of variants that are a factorial of the number of assets combinations of the smart brand asset.

Modifying Payload Based on Specified Brand Guidelines

A smart brand asset can dynamically identify its web page environment and change its payloads based on the environment, according to pre-defined brand guidelines. The smart brand asset system can specify brand guidelines so that smart grand assets can be determined based on the environments in which they are placed. For instance, the webpage containing a smart brand asset may have a particular dark background color. The system may determine to show a brand asset within the smart brand asset (e.g., a logo) using a color contrast to the background color (e.g. a bright color). Thus, the brand asset has more visual impact to the viewers of the smart brand asset.

When the system creates a smart brand asset, additional information about the brand guidelines that govern the use of the smart brand asset will be collected from, e.g., a brand owner or his representative. In other words, a brand owner configures the guidelines determining how the smart brand asset is rendered dynamically on different website servers. For example, the guidelines can determine aspect ratio, padding around the image, or color usage of the smart brand asset. In addition, brand asset variants can be associated with the guidelines. For instance, a guideline may determine to present a monochromatic version or a four-color version of the smart brand asset. Based on web page characteristics, the system can instruct a website server to render the smart brand asset differently based on the brand guidelines.

The smart brand asset dynamically identifies the environment in which the smart asset is placed and changes its presentation characteristics based upon the environment, according to the pre-defined brand guidelines. The process is performed without human intervention or manual decision-making. When brand guidelines change over time, the smart brand asset can deliver different behavior on third-party website servers without requiring modifications by owners or administrators of the third-party website servers.

Upon loading the smart brand asset, the smart brand asset system checks for an alternative or default image and delivers a javascript observer. The observer assigns a location identification (or server identification, for example) and determines one or more characters (e.g., background color or size constraint) of the web page containing the smart brand asset. The observer returns the location identification and the characters back to the smart brand asset system. The smart brand asset system uses an algorithm to determine the characteristic of the smart brand asset (e.g., light or darkness, hexcolor, etc.) associated with the location identification. For instance, the system may determine how to present a logo, e.g., in black and white or in full color, reverse or positive image. The system can also resize the image of the smart brand asset or even the smart brand asset itself to fit the environment of the web page. After the adjustment of the smart brand asset, the system selects the alternative presentation of the smart brand asset and associates the alternative presentation with the location identification. Upon notified by the system, the observer running at the server replaces the default presentation of the smart brand asset with the alternative presentation.

As the smart brand asset being placed on their party websites, the system can determine whether an object (e.g. a logo) of the smart brand asset is optimally presented or not, based on the brand guidelines. If not, the system will present the best possible alternative presentation of the smart brand asset determined by the brand guidelines. This ensures a quality aesthetics and better brand experience for the brand owner, brand partner and consumer.

The smart brand asset continuously optimizes how it looks based on the guidelines. This is different from traditional processes where humans make manual (often poor) choices as to how an object (e.g. a logo) is presented under a specific set of circumstances. Such a poor choice is the result of a lack of information about the brand owner's preferences under the specific circumstance. Via the brand guidelines for the smart brand assets, the system knows the brand owner's preferences and can recommend preferred presentation of the smart brand assets (e.g. payloads) that leverage the brand owner's preferences automatically.

Figure 7:
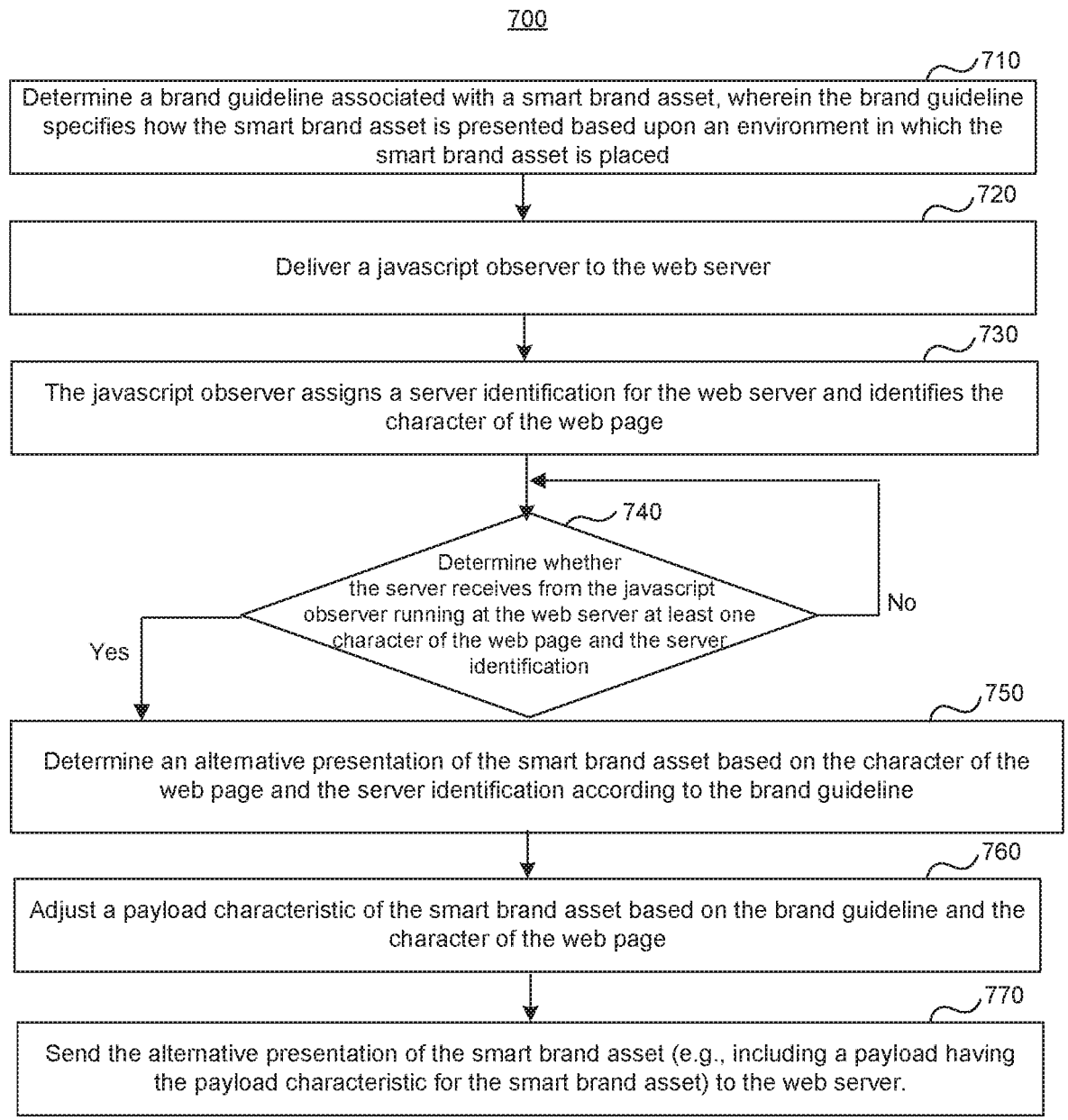
FIG. 7 is an example flow diagram showing a mechanism of determining smart brand assets based on brand guidelines, according to an embodiment of the invention.

FIG. 7 is an example flow diagram showing a mechanism of determining smart brand assets based on brand guidelines, according to an embodiment of the invention. In step 710, the brand asset server determines a brand guideline associated with a smart brand asset, wherein the brand guideline specifies how the smart brand asset is presented based upon an environment in which the smart brand asset is placed. The brand guideline can specify, e.g., an aspect ratio of the smart brand asset, padding around the smart brand asset, color usage of a section of the smart brand asset, or a display size of the smart brand asset. A brand owner of the smart brand owner can configure the guideline specifying how the smart brand asset is rendered dynamically on web servers hosting the smart brand asset.

In step 720, the brand asset server delivers a javascript observer to the web server. In step 730, the javascript observer assigns a server identification for the web server and identifies the character of the web page. In step 740, the smart brand server determines whether it receives from the javascript observer running at the web server at least one character of the web page and the server identification. If nothing has received from the javascript observer, the smart brand server continues to wait.

Upon receiving from the javascript observer, in step 750, the smart brand server determines an alternative presentation of the smart brand asset based on the character of the web page and the server identification according to the brand guideline. The character of the web page can comprise, e.g., a background color of the web page or a size constraint of the smart brand asset.

In step 760, the smart brand server may further adjust a payload characteristic of the smart brand asset based on the brand guideline and the character of the web page. The payload characteristic of the smart brand asset can be adjusted automatically based on the brand guideline without human intervention or manual decision-making. The payload characteristic of the smart brand asset can be also adjusted based on an algorithm to determine the payload characteristic associated with an identification of the webserver.

In step 770, the smart brand server sends the alternative presentation of the smart brand asset (e.g., including a payload having the payload characteristic for the smart brand asset) to the web server.

Analytics of Websites and Consumers

A smart brand asset system can continuously analyze websites hosting a smart brand asset and it consumers interacting with the smart brand asset. For example, the brand owner prefers to measure how the brand assets are performing. Such a performance inquiry may include how often consumers see the smart brand asset; on what sites the smart brand asset is the most popular; how a commercial campaign using the smart brand asset performs; etc.

The brand owner wants to see the relevant data from websites across the network, for specific products or brands or campaigns presented in smart brand asset(s) hosted by the websites. The relevant data may include reach, frequency, engagement (i.e. what the consumers do when they interact with the smart brand asset), and the return of the investment on specific websites as wells as consumers interacting with the smart brand asset, conversion rates from the interactions, etc.

For each smart brand asset, the smart brand asset system records the user interaction and viewing of the smart brand asset. The brand owner can be presented with various dashboards that display various reports measuring the effectiveness of the brand. The smart brand asset analytics enable the brand owners to view the measurement on the effectiveness of their brand assets when the assets are hosted on third party websites.

Figure 8:
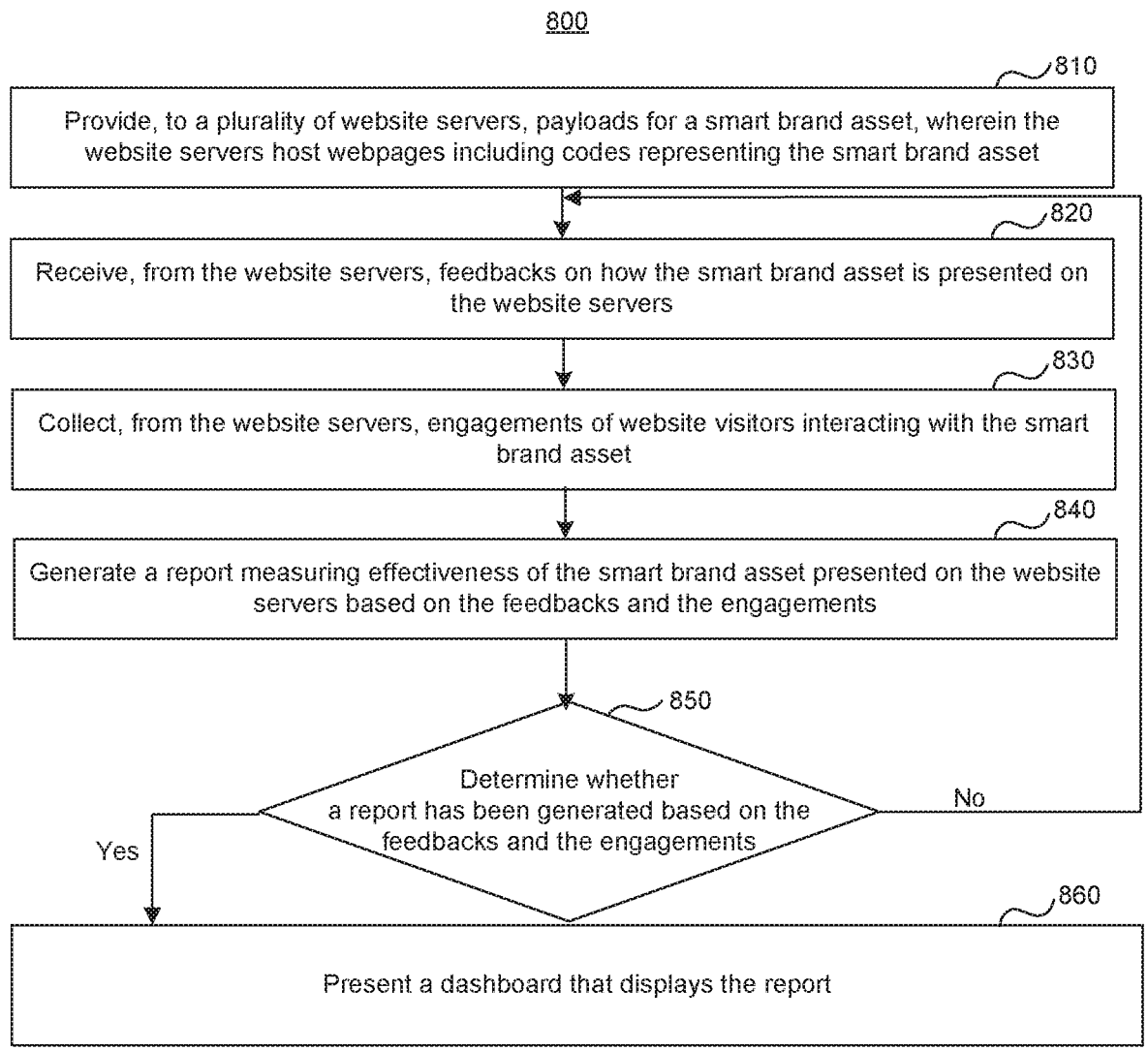
FIG. 8 is an example flow diagram showing a mechanism of analytics of web servers hosting smart brand assets, according to an embodiment of the invention.

FIG. 8 is an example flow diagram showing a mechanism of analytics of web servers hosting smart brand assets, according to an embodiment of the invention. In step 810, the brand asset server provides, to a plurality of website servers, payloads for a smart brand asset, wherein the website servers host webpages including codes representing the smart brand asset.

In step 820, the brand asset server receives, from the website servers, feedbacks on how the smart brand asset is presented on the website servers. In step 830, the brand asset server collects, from the website servers, engagements of website visitors interacting with the smart brand asset. The engagements of the website visitors interacting with the smart brand asset can include, e.g., frequencies of the engagements, types of the engagements, identification of the website visitors, or conversion rates of the smart brand asset.

In step 840, the brand asset server generates a report measuring effectiveness of the smart brand asset presented on the website servers based on the feedbacks and the engagements. The report can, e.g., identify a website server among the website servers that attracts the most visitors reviewing the smart brand asset. The report can also suggest a performance level of a commercial campaign using the smart brand asset as a promotional presentation.

In step 850, the brand asset server determines whether a report has been generated based on the feedbacks and the engagements. If not, the brand asset server continues to receive feedbacks and collect engagements as in steps 820 and 830. If there is a report generated, in step 860, the brand asset server presents a dashboard that displays the report. The report can be presented to a brand owner such that the brand owner has a view into the effectiveness of the smart brand asset hosted by the plurality of website servers.

Search Engine Optimization of Smart Brand Assets

The smart brand asset system enables the search engines to search and index the content of the smart brand assets. Users who find the content of a smart brand asset via an Internet search can be directed to the server that contains the smart brand asset.

For example, a brand owner prefers that the smart brand asset hosted by websites is searchable by search engine web crawlers as if the content of the smart brand asset resides on the websites that the searches are conducted. The users searching for the content will be directed to the websites actually host the content of the smart brand asset.

Search engine's crawlers (e.g., using Google's hash bang syntax) can be pointed to a smart brand asset proxy server with a parameter that contains a unique identification for the smart brand asset (e.g., customer.com/page.html #!synqy{id}). The crawlers are then directed to the smart brand asset system's server where the HTML code for the web page and HTML code for the smart brand asset can be read and indexed.

Each website owner who chooses to use the proxy feature can configure proxies for each smart brand asset hosted on their website. Users can find the smart brand asset via an Internet search and be direct to the content of the smart brand asset stored in a server belongs to a brand owner or brand partner.

Syndicated content, such as the content of the smart brand asset, can provide information useful to consumers while delivering content for website owners at low costs. When smart brand asset content can be updated regularly, this can provide a high relevancy in searching engine indexing. Websites having traditional syndicated content tend to score lower on search engine results (e.g., Google search) as the search engines' indexing algorithms punish sites using syndicated content. With a smart brand asset that uses a proxy, site owners can have their content indexed by the search engine and receive a high search result ranking due to being index and having fresh content. Users will be directed to the site owner's site for smart brand asset content because of the high search engine ranking, which is beneficial to both the website owner and brand owner.

Figure 9:
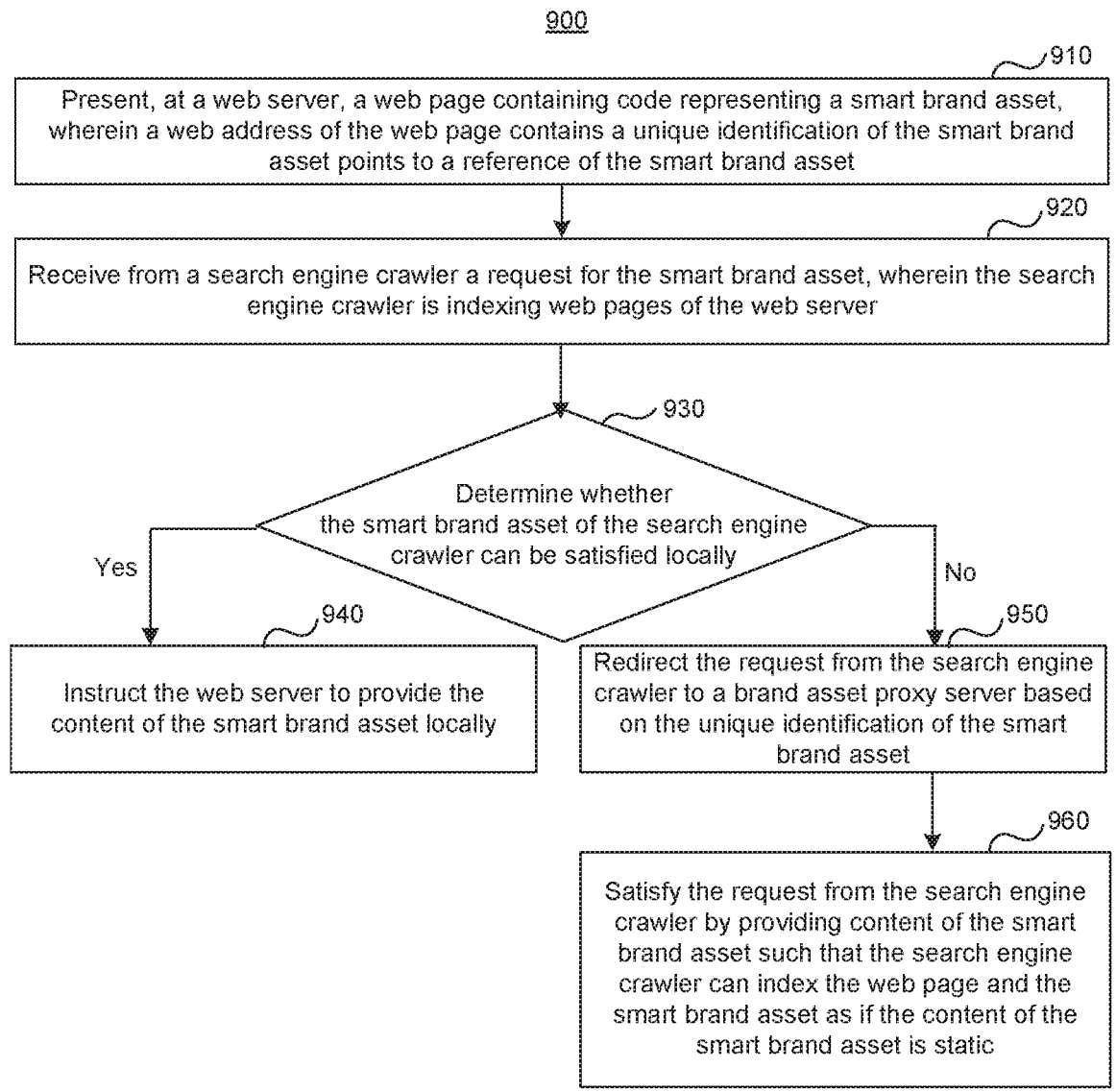
FIG. 9 is an example flow diagram showing a mechanism of search engine optimization for smart brand assets, according to an embodiment of the invention.

FIG. 9 is an example flow diagram showing a mechanism of search engine optimization for smart brand assets, according to an embodiment of the invention. In step 910, the brand asset server presents, at a web server, a web page containing code representing a smart brand asset, wherein a web address of the web page contains a unique identification of the smart brand asset points to a reference of the smart brand asset. The unique identification of the smart brand asset can be determined, e.g., by the brand asset proxy server and sent to the web server. The web server is configured to redirecting search requests of the smart brand asset to the brand asset proxy server.

In step 920, the brand asset server receives from a search engine crawler a request for the smart brand asset, wherein the search engine crawler is indexing web pages of the web server.

In step 930, the brand asset server determines whether the smart brand asset of the search engine crawler can be satisfied locally. If so, the brand asset server can instruct the web server to provide the content of the smart brand asset locally in step 940.

If the request cannot be satisfied locally, in step 950, the brand asset server redirects the request from the search engine crawler to a brand asset proxy server based on the unique identification of the smart brand asset.

In step 960, the proxy server satisfies the request from the search engine crawler by providing content of the smart brand asset such that the search engine crawler can index the web page and the smart brand asset as if the content of the smart brand asset is static. The request from the search engine crawler can be satisfied such that index of the web page can be established as if the content of the smart brand asset is static. The content of the smart brand asset can be searchable and indexed by a search engine such that users who find the content via a web search can be directed to the web server that hosts the web page containing code representing the smart brand asset. The proxy server may satisfy the request from the search engine crawler such that the web page receives a high page rank due to being indexed and having dynamically provided the content.

Exemplary Digital Data Processing Apparatus

Figure 10:
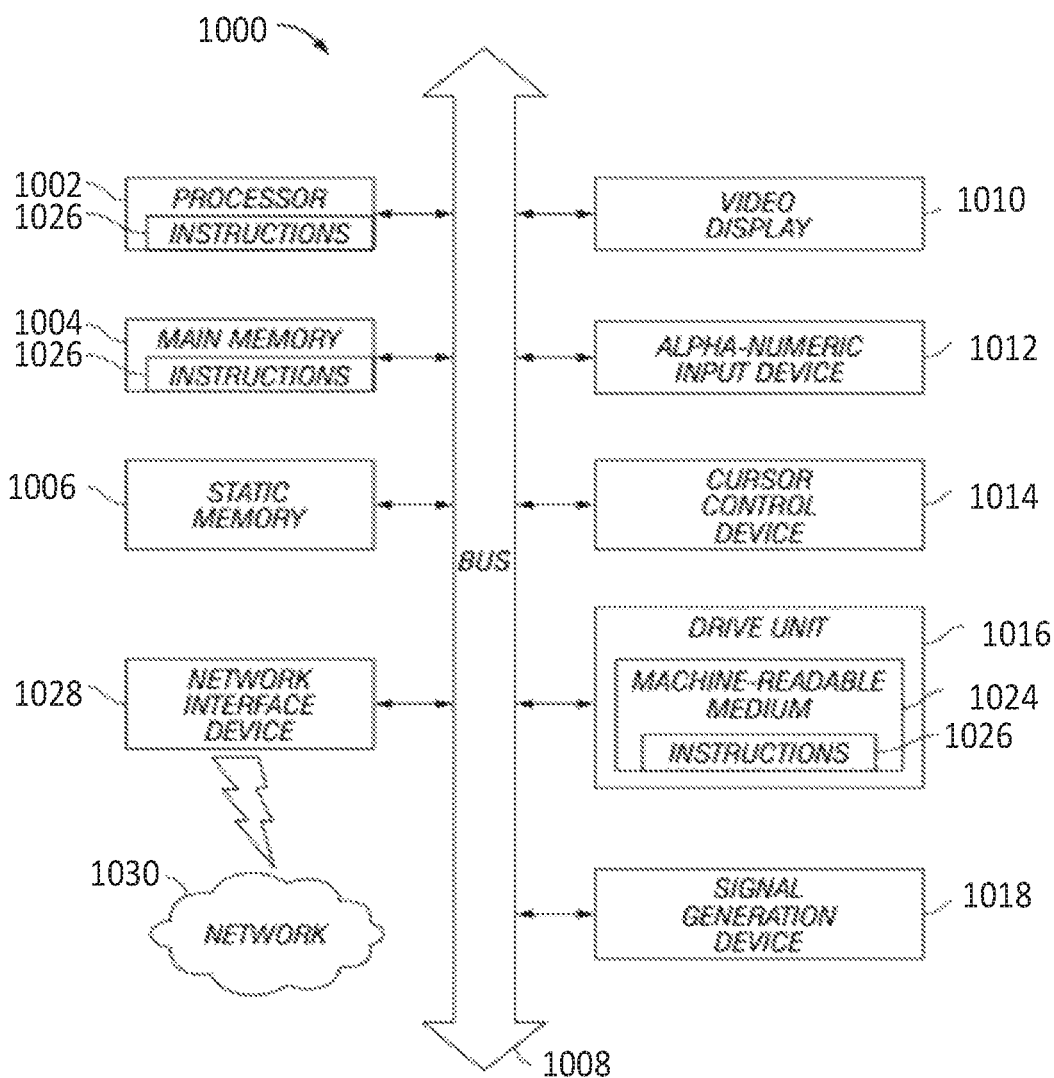
FIG. 10 is an example block diagram of a digital data processing apparatus, according to an embodiment of the invention.

Embodiments of the invention may be implemented using a digital data processing apparatus. As a specific example, FIG. 10 shows a digital data processing apparatus 1000. The apparatus 1000 includes a processor 1002, such as a microprocessor, personal computer, mobile phone or other mobile personal computing device, workstation, controller, microcontroller, state machine, or other processing machine, coupled to a digital data storage 1004. In the present example, the storage 1004 includes a fast-access storage 1006, as well as nonvolatile storage 1008. The fast-access storage 1006 may be used, for example, to store the programming instructions executed by the processor 1002. The storage 1006 and 1008 may be implemented by various devices. Many alternatives are possible. For instance, one of the components 1006, 1008 may be eliminated; furthermore, the storage 1004, 1006, and/or 1008 may be provided on-board the processor 1002, or even provided externally to the apparatus 1000.

The apparatus 1000 also includes an input/output 1010, such as a connector, line, bus, cable, buffer, electromagnetic link, network, modem, transducer, IR port, antenna, or other means for the processor 1002 to exchange data with other hardware external to the apparatus 1000.

Various instances of digital data storage may be used to embody the storage 1004 and 1008, and for other purposes. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage, or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Other Embodiments

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

The invention claimed is:

1. A computer-implemented method for analytics of web servers hosting smart brand assets, the method comprising:

providing, to a plurality of website servers, payloads for a smart brand asset, wherein the website servers host webpages including codes representing the smart brand asset;

delivering an observer to the plurality of website servers, wherein each observer assigns a server location identification for each website server;

receiving, from each observer running at each website server, feedback on how the smart brand asset is presented on the website servers and including at least one indicated characteristic of the respective webpages and the server location identification, wherein the indicated characteristic is associated with the location identification;

collecting, from the website servers, engagements of website visitors interacting with the smart brand asset;

generating a report measuring effectiveness of the smart brand asset presented on the website servers based on the feedback and the engagements;

presenting a dashboard that displays the report;

dynamically adjusting, at the brand asset server, a payload characteristic of the smart brand asset at a given website server of the plurality of website servers based on the feedback and the indicated characteristic of the webpage to cause a presentation of the smart brand asset at the web page to be dynamically adjusted;

associating, by the brand asset server, the dynamically adjusted one or more payload characteristic with the location identification;

sending the dynamically adjusted payload characteristic for the smart brand asset to the given website server; and replacing, by the observer, a default representation of the smart brand asset with the dynamically adjusted payload characteristic associated with the location identification, wherein the dynamically adjusted payload characteristic is presented during each visit to the webpage.

2. The method of claim 1, wherein the report identifies a website server among the website servers that attracts the most visitors reviewing the smart brand asset.

3. The method of claim 1, wherein the report suggests a performance level of a commercial campaign using the smart brand asset as a promotional presentation.

4. The method of claim 1, wherein the engagements of the website visitors interacting with the smart brand asset include frequencies of the engagements, types of the engagements, identification of the website visitors, or conversion rates of the smart brand asset.

5. The method of claim 1, wherein the report is presented to a brand owner such that the brand owner has a view into the effectiveness of the smart brand asset hosted by the plurality of website servers.

6. The method of claim 1, wherein providing payloads for a smart brand asset further comprises:

providing a different arrangement of payloads for a smart brand asset to the plurality of website servers.

7. The method of claim 1 further comprising:

assigning a performance score for each individual engagement of the engagements by assessing conversion events of the individual engagement.

8. The method of claim 7 further comprising:

in response to assigning a performance score, determining that there is an arrangement of payloads associated with a highest performance score;

selecting the arrangement as the best performance arrangement for future presentation of the smart brand asset;

receive a request for sending payloads of the smart brand asset; and in response to receiving the request, sending the arrangement of payloads associated with the highest performance score.

9. The method of claim 7 further comprising:

in response to assigning a performance score, determining there is not an arrangement of payloads associated with a highest performance score; and in response to determining that there is not an arrangement of payloads with the highest performance score, waiting for more data of engagements of website visitors interacting with the smart brand asset.

10. A computer-implemented method for analytics of web servers hosting smart brand assets, the method comprising:

providing, to a plurality of website servers, payloads for a smart brand asset, wherein the website servers host webpages including codes representing the smart brand asset;

delivering an observer to the plurality of website servers, wherein each observer assigns a server location identification for each website server;

receiving, from each observer running at each website server, feedback on how the smart brand asset is presented on the website servers and including at least one indicated characteristic of the respective webpages and the server location identification, wherein the indicated characteristic is associated with the location identification;

collecting, from the website servers, engagements of website visitors interacting with the smart brand asset;

generating a report measuring effectiveness of the smart brand asset presented on the website servers based on the feedback and the engagements;

determine that a report has been generated based on the feedback and the engagements;

in response to determining that the report has been generated, presenting a dashboard that displays the report;

dynamically adjusting, at the brand asset server, a payload characteristic of the smart brand asset at a given website server of the plurality of website servers based on the feedback and the indicated characteristic of the webpage to cause a presentation of the smart brand asset at the web page to be dynamically adjusted;

associating, by the brand asset server, the dynamically adjusted one or more payload characteristic with the location identification;

sending the dynamically adjusted payload characteristic for the smart brand asset to the given website server; and replacing, by the observer, a default representation of the smart brand asset with the dynamically adjusted payload characteristic associated with the location identification, wherein the dynamically adjusted payload characteristic is presented during each visit to the webpage.

11. The method of claim 10, wherein the report identifies a website server among the website servers that attracts the most visitors reviewing the smart brand asset.

12. The method of claim 10, wherein the report suggests a performance level of a commercial campaign using the smart brand asset as a promotional presentation.

13. The method of claim 10, wherein the engagements of the website visitors interacting with the smart brand asset include frequencies of the engagements, types of the engagements, identification of the website visitors, or conversion rates of the smart brand asset.

14. The method of claim 10, wherein the report is presented to a brand owner such that the brand owner has a view into the effectiveness of the smart brand asset hosted by the plurality of website servers.

15. An electronic device comprising:

a network interface for communication with a web server over a network;

a processor; and a memory having instructions stored thereon that, when executed by the processor, cause the processor to:

provide, to a plurality of website servers, payloads for a smart brand asset, wherein the website servers host webpages including codes representing the smart brand asset;

deliver an observer to the plurality of website servers, wherein each observer assigns a server location identification for each website server;

receive, from each observer running at each website server, feedback on how the smart brand asset is presented on the website servers and including at least one indicated characteristic of the respective webpages and the server location identification, wherein the indicated characteristic is associated with the location identification;

collect, from the website servers, engagements of website visitors interacting with the smart brand asset;

generate a report measuring effectiveness of the smart brand asset presented on the website servers based on the feedbacks and the engagements;

present a dashboard that displays the report dynamically adjust, at the brand asset server, a payload characteristic of the smart brand asset at a given website server of the plurality of website servers based on the feedback and the indicated characteristic of the webpage to cause a presentation of the smart brand asset at the web page to be dynamically adjusted;

associate, by the brand asset server, the dynamically adjusted one or more payload characteristic with the location identification;

send the dynamically adjusted payload characteristic for the smart brand asset to the given website server; and replace, by the observer, a default representation of the smart brand asset with the dynamically adjusted payload characteristic associated with the location identification, wherein the dynamically adjusted payload characteristic is presented during each visit to the webpage.

16. The electronic device of claim 15, wherein the report identifies a website server among the website servers that attracts the most visitors reviewing the smart brand asset.

17. The electronic device of claim 15, wherein the report suggests a performance level of a commercial campaign using the smart brand asset as a promotional presentation.

18. The electronic device of claim 15, wherein the engagements of the website visitors interacting with the smart brand asset include frequencies of the engagements, types of the engagements, identification of the website visitors, or conversion rates of the smart brand asset.

19. The electronic device of claim 15, wherein the report is presented to a brand owner such that the brand owner has a view into the effectiveness of the smart brand asset hosted by the plurality of website servers.

20. The electronic device of claim 15, wherein the instructions further cause the processor to:
   assign a performance score for each individual engagement of the engagements by assessing conversion events of the individual engagement.

* * * * *